United States Patent [19]

Vulpitta et al.

[11] Patent Number: 5,086,949
[45] Date of Patent: Feb. 11, 1992

[54] CHEMICAL FLOW STREAM SEPARATOR

[75] Inventors: Anthony C. Vulpitta, Lansing, Ill.; William P. Dwyer, Meriden; Thomas P. Patrosh, Wallingford, both of Conn.

[73] Assignee: Olin Corporation, Cheshire, Conn.

[21] Appl. No.: 588,111

[22] Filed: Sep. 25, 1990

[51] Int. Cl.5 .............................................. B67D 5/00
[52] U.S. Cl. .................................... 222/1; 222/145; 222/148; 222/504; 134/95; 134/169 R; 239/112; 239/413; 239/433
[58] Field of Search ............ 222/1, 145, 148, 135, 222/136, 504; 239/112, 413, 417, 412, 433; 137/240; 134/95, 169 R, 166 R

[56] References Cited

U.S. PATENT DOCUMENTS

| 3,146,950 | 9/1964 | Lancaster | 239/112 |
|---|---|---|---|
| 3,263,928 | 8/1966 | Gusmer | 239/123 |
| 3,393,872 | 7/1968 | Rankin | 239/117 |
| 3,690,557 | 9/1972 | Higgins | 239/112 |
| 3,941,355 | 3/1976 | Simpson | 259/4 AC |
| 4,003,501 | 1/1977 | Ramazzotti et al. | 222/135 |
| 4,060,572 | 11/1977 | Widman | 239/113 |
| 4,073,664 | 2/1978 | Zwirlein | 134/18 |
| 4,117,551 | 9/1978 | Books et al. | 366/162 |
| 4,129,231 | 12/1978 | Larson | 222/145 |
| 4,302,481 | 11/1981 | Ribnitz et al. | 239/112 |
| 4,377,256 | 3/1983 | Commette et al. | 239/117 |
| 4,469,251 | 9/1984 | Sperry et al. | 222/135 |
| 4,534,802 | 8/1985 | Gates et al. | 134/22.12 |
| 4,568,003 | 2/1986 | Sperry et al. | 222/145 |
| 4,850,705 | 7/1989 | Horner | 366/339 |
| 4,867,346 | 9/1989 | Faye et al. | 222/145 |
| 4,913,317 | 4/1990 | Wernicke | 222/1 |
| 4,923,522 | 5/1990 | Sowers | 134/166 R |

Primary Examiner—Donald T. Hajec
Assistant Examiner—Philippe Dergkshan
Attorney, Agent, or Firm—Ralph D'Alessandro

[57] ABSTRACT

An improved plural component dispensing apparatus having a chemical flow stream separator to ensure separation of the isocyanate and polyol plural components is disclosed to permit solventless operation and the cleaning by an aqueous cleaning medium followed by a gaseous drying purge stream to prevent the reaction of water and the isocyanate component.

16 Claims, 3 Drawing Sheets

CHEMICAL FLOW STREAM SEPARATOR

BACKGROUND OF THE INVENTION

The present invention relates generally to apparatus used to dispense a plurality of liquids through a single orifice, and more particularly it relates to an insert used in a polyurethane foam dispenser to separate the plural polyurethane foam mix components from each other in the dispenser and to permit water flushing to occur to obtain a foam dispenser that may be utilized without the need for solvent cleaning.

Polyurethane foams are formed by the reaction of an isocyanate component and hydroxyl-bearing compounds. When mixed in the presence of a catalyst, a surfactant, and a blowing agent, these chemicals react to form cellular cross-linked polymer chains, more commonly known as a polyurethane foam. Each of these components of the plural component material, by itself, is generally stable. Thus, each component will not cure or cross-link for extended periods of time, often as long as several months, if they are properly stored. However, when the isocyanate component and the polyol component, a preformulated compound that includes a surfactant, a catalyst and a blowing agent, are mixed together in proper proportions, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in insulating or packaging applications. Their use is particularly widespread in the boat manufacturing industry, where foam is used to enhance the buoyancy of the watercraft and in the refrigeration industry, where foam is used to insulate cooling compartments such as refrigerators, freezers and large refrigerated railroad tank cars or highway trucks. This type of a manufacturing application requires a low density foam that can be dispensed by apparatus. One of the problems with foam dispensing equipment used in the marine and refrigeration industries involves the need to obtain a fully expanded low density foam that does not readily cure within the dispenser or after curing require solvent cleaning. This latter consideration is becoming a more compelling need because of the hazardous chemicals employed as solvents, concern with environmental pollution and imminent strict governmental regulations in this area.

Prior foam dispensing apparatus has employed either an air purging, solvent purging or flushing, mechanical purging such as with a rod optionally fitted with a surrounding scraper, or a combination of these approaches in order to obtain plural component foam dispensing apparatus with sufficiently long operating times before requiring cleaning or replacement of internally clogged components. Typical examples of devices utilizing such systems include those disclosed in U.S. Pat. Nos. 3,263,928; 4,377,256; 4,469,251; 4,534,802; 4,568,003 and 4,867,346. However, these devices do not always yield the desired length of operating time without internal clogging with cured foam or utilize undesirable solvent to obtain the required and desired operating time.

Recent approaches have incorporated the concept of keeping the flow of plural polyurethane foam components separate within the dispenser until the streams enter a separate mixing chamber to prevent the reactive impingement mixing of the foam components from occurring within the dispenser and clogging the internal flow passages within the apparatus with cured or set foam. U.S. Pat. No. 4,913,317 discloses one apparatus that has taken such an approach with the use of a central plug. However, this approach still has the potential for clogging since it uses a compressed gas purge that has proven ineffective in the past to prevent the buildup of foam without the use of a solvent.

Additionally the use of an aqueous medium to flush a dispensing apparatus heretofore has not been successful because residual water reacts with the isocyanate component and damages the unit.

These problems are solved in the design of the present invention by providing an improved insert within a plural component dispensing apparatus that serves to separate the flow streams of plural urethane foam components and permits the flow of water through separate ports in the insert to flush from the dispensing apparatus any residual components or reacted components that have formed urethane foam.

SUMMARY OF THE INVENTION

It is an object of the present invention to provide an improved insert in a plural component polyurethane foam dispenser that separates the component flow streams and permits flushing of the dispenser with an aqueous medium.

It is another object of the present invention to provide an improved solventless plural component polyurethane foam component dispenser that can operate for long periods of time without clogging.

It is a feature of the present invention that the improved chemical flow stream separator employs separate passages for the flow of an aqueous medium for each plural component to permit the flushing of the apparatus after use.

It is another feature of the present invention that each separate aqueous medium flow passage feeds into a corresponding plural component flow passage to flush the polyurethane flow component flow passages after use.

It is still another feature of the present invention that a compressed air infeed is provided into each aqueous flush flow passage to dry any residual water remaining in the passages after flushing.

It is yet another feature of the present invention that the chemical flow stream separator and the mixing chamber are an integral component that is disposable.

It is an advantage of the present invention that a low cost and reliable solventless foam dispenser is obtained.

It is another advantage of the present invention that the improved chemical flow stream separator is simple in design and easily replaceable.

It is a further advantage of the present invention that a well mixed urethane foam is obtained at low pressure operation by the use of the chemical flow stream separator.

It is yet another advantage of the present invention that the handling of hazardous solvent chemicals is avoided by the use of the improved chemical flow stream separator.

It is still another advantage of the present invention that a well mixed urethane foam is obtained by the use of the improved chemical flow stream separator in a foam dispenser that does not utilize solvent for cleaning.

These and other objects, features and inventions are obtained in the improved polyurethane foam plural component flow stream separator of the present invention employed in conjunction with a foam dispensing apparatus wherein an easily removable insert is provided in the foam dispenser block with separate plural component flow passages that are separate until the flow of components is joined in a single stream within an integral mixing chamber. Each plural component flow passage has a corresponding flush passage that delivers an aqueous flushing medium to the plural component flow passages after use to clean any residual foam components or mixed foam from the internal passageways of the dispenser.

BRIEF DESCRIPTION OF THE DRAWINGS

The advantages of this invention will become apparent upon consideration of the following detailed description of the invention, especially when it is taken in conjunction with the accompanying drawings wherein.

DETAILED DESCRIPTION OF THE PREFERRED EMBODIMENT

Figure 1:
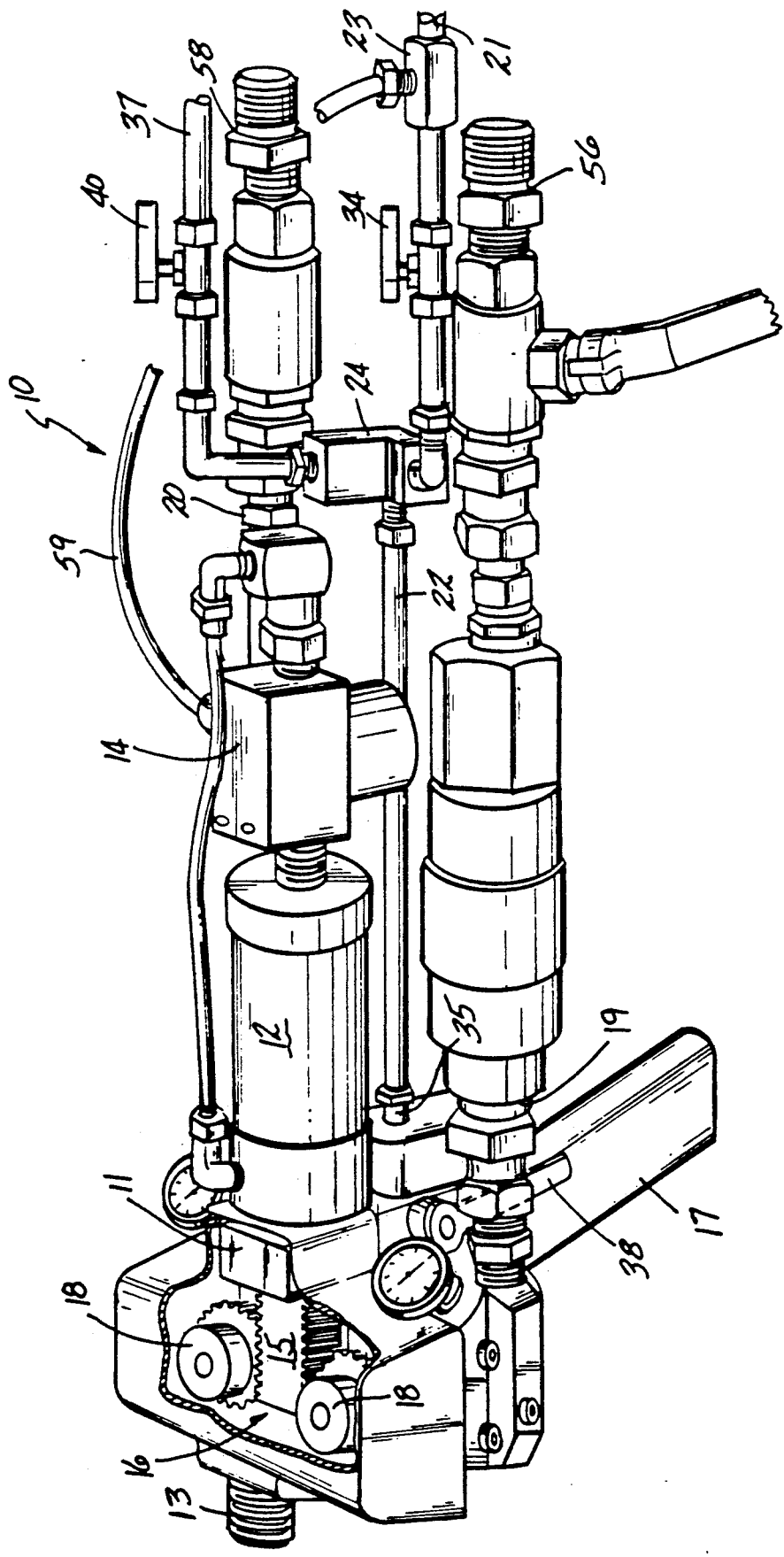
FIG. 1 is a perspective view of a foam dispensing apparatus employing the improved chemical flow stream separator of the present invention.

FIG. 1 shows in a perspective view the foam dispenser, indicated generally by the numeral 10. As seen in this view, dispenser 10 has a gun manifold or block 11 with a nozzle to which is attached a static mixer (not shown). A pneumatic cylinder 12 is shown attached to the rear of the gun block 11. An electric solenoid valve 14 connects to the cylinder 12 to control the flow of pressurized air to the cylinder 12, whose piston (not shown) drives the rack 15 of the rotary gear valve assembly 16 to turn the gears 18 to control the synchronous flow of plural components into the improved chemical flow separator (not shown) within the gun block 11. An electric trigger (not shown) is connected to a handle 17 to control the flow of air into the cylinder 12 and, hence, the flow of plural components through the dispenser 10.

Figure 2:
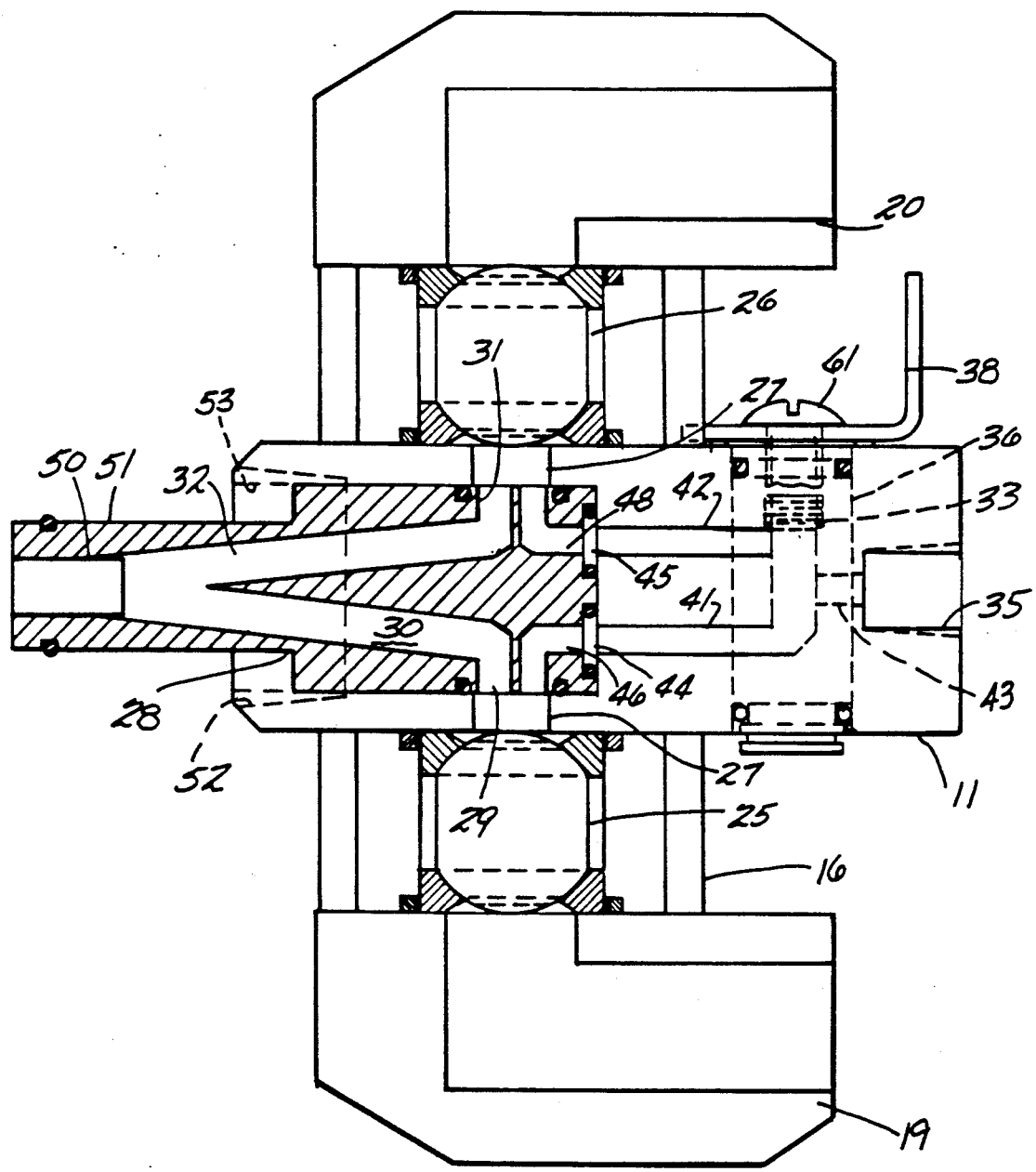
FIG. 2 is a bottom plan view of the improved chemical flow stream separator of the present invention showing the separator inserted within the gun block of the dispenser.

Also seen in FIG. 1 is the isocyanate A side feed line 19 with couplings 56 and the polyol B side feed line 20 with couplings 58 (partially visible). An air supply line 21 is shown to the rear of the manifold 11 with connections feeding the solenoid valve 14 and the drying air feed line 22 from air line 59 and the three way pipe tee or coupling 24, respectively. The solenoid valve, upon activation by the electric trigger (not shown), permits pressurized gas to flow from the air feed pipe tee 23 to the cylinder 12 to cause movement of the piston within cylinder 12 to thereby control the movement of the rack 15 and the rotation of the rotary gear valve assembly 16. As the rack 15 synchronously causes the gears 18 of gear valve assembly 16 to rotate, the flow of the isocyanate and polyol components into the chemical flow separator 28 of FIG. 2 is controlled through the rotary valves 25 and 26 into inlet orifices 29 and 31 in opposing sides of the separator 28. When the rotary valves 25 and 26 are in the open position for the flow of the plural components, the isocyanate component flows from the feed line 19 into the isocyanate internal passage 30 and the polyol component flows from the feed line 20 into the polyol internal passage 32 within the separator 28.

The air supply line 21 divides at air feed pipe tee 23 to supply pressurized gas to the previously described cylinder 12 and solenoid valve 14 and on demand to feed through control valve 34 into the rear of manifold or gun block 11 via coupling 24 prior to feedline 22. Feedline 22 feeds into a fitting 35 that is threadingly fastened to the back of block 11 where continued access into the block 11 is controlled by rotating valve 36. Valve 36 is controlled in its rotational movement between open and closed positions by the rotation of lever 38 about the mounting of screw 61, best seen in FIGS. 2 and 3. The lever 38 is keyed to the valve 36 and can have a washer between it and the gun block 11. Valve 36 is secured for rotational movement on its opposing side by an appropriate means, such as a snap ring. A set screw 33 can also be used with screw 61, which in combination with appropriate O-ring seals, makes the valve chamber 39 fluid-tight. The set screw 33 is placed within a tapped hole of about $\frac{1}{4}$ inch, for example, so that it is fully tightened within the gun block 11 and secured against further rotation. In the closed position valve 36 serves as a check valve.

Figure 4:
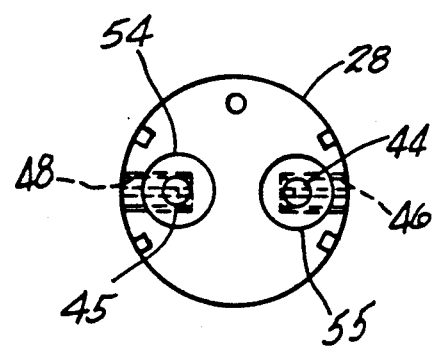
FIG. 4 is a rear elevational view of the improved chemical flow stream separator of the present invention showing the water flush inlets through which the flushing aqueous medium initially enters the separator.

Referring again to FIG. 1, an aqueous cleaning medium also flows into the gun block 11 via the same feedline 22 by the closing of the manual air control valve 34 on air supply line 21 and the opening of the manual aqueous cleaning medium control valve 40. This allows an aqueous cleaning medium, such as soapy water, to flow from the aqueous cleaning medium feed line 37 through the control valve 40 into the coupling 24 and the feedline 22 and then into the rear of gun block 11 through the fitting 35. In the cleaning mode of operation, best understood by viewing FIG. 2, the aqueous cleaning medium flows first through the fitting 35 and into the cleaning passage 43 when the rotating valve 36 is in the open position. The medium then passes into the isocyanate and polyol internal gun block feed passages 41 and 42 via the valve 36 from where it enters the rear of the separator 28 through the orifices 44 and 45 that are within annular sealing recesses 54 and 55 (see briefly FIG. 4). Recesses 54 and 55 accommodate appropriate sealing devices, such as o-rings, connecting orifices 44 and 45 to the isocyanate and polyol feed passages 41 and 43 to effect a liquid-tight seal against the separator 28. The aqueous cleaning medium then passes through the passages 41 and 42 into the internal cleaning and drying passages 46 and 48 of the separator 28 and out through outlet port 49 in each of the recessed openings 27 in the side or periphery of the separator 28 adjacent the isocyanate infeed orifice 29 and the polyol infeed orifice 31. This permits the aqueous cleaning medium to clean the portion of the rotary valves 25 and 26 exposed to the isocyanate and polyol infeed orifices 29 and 31, respectively, and then flow back into the interior of separator 28 through orifices 29 and 31 into the isocyanate and polyol internal feed passages 30 and 32, respectively.

It should be noted that the isocyanate and polyol infeed orifices 29 and 31 are sized to the desired dispenser 10 output to control the back pressure of the components upstream of the orifices 29 and 31 to prevent premature frothing.

As is best seen in FIG. 2, internal feed passages 30 and 32 are angled from the rear to the front of the separator 28 so that they join together in a mixing chamber 50 at the very front of the separator 28 in a section that is of smaller diameter than the rear section of the separator 28. These separate feed passages 30 and 32 within the separator or stream splitter 28 that is inserted into the gun block 11 keeps the isocyanate A side and polyol B side components separated until they enter the mixing chamber 50 within the nozzle 51 of the separator 28. It is at this junction in the mixing chamber 50 that the isocyanate and polyol components react by impingement mixing and exit the dispenser 10 into the static mixer (not shown) that is fastened to the gun block 11 by the adapter fitting 13 of FIG. 1. The combined components are further mixed in the static mixer tubular housing with its mixing elements (both not shown). A fluid-tight seal is effected between the static mixer and the nozzle portion 51 with its mixing chamber 50 by appropriate means, such as o-rings.

Figure 3:
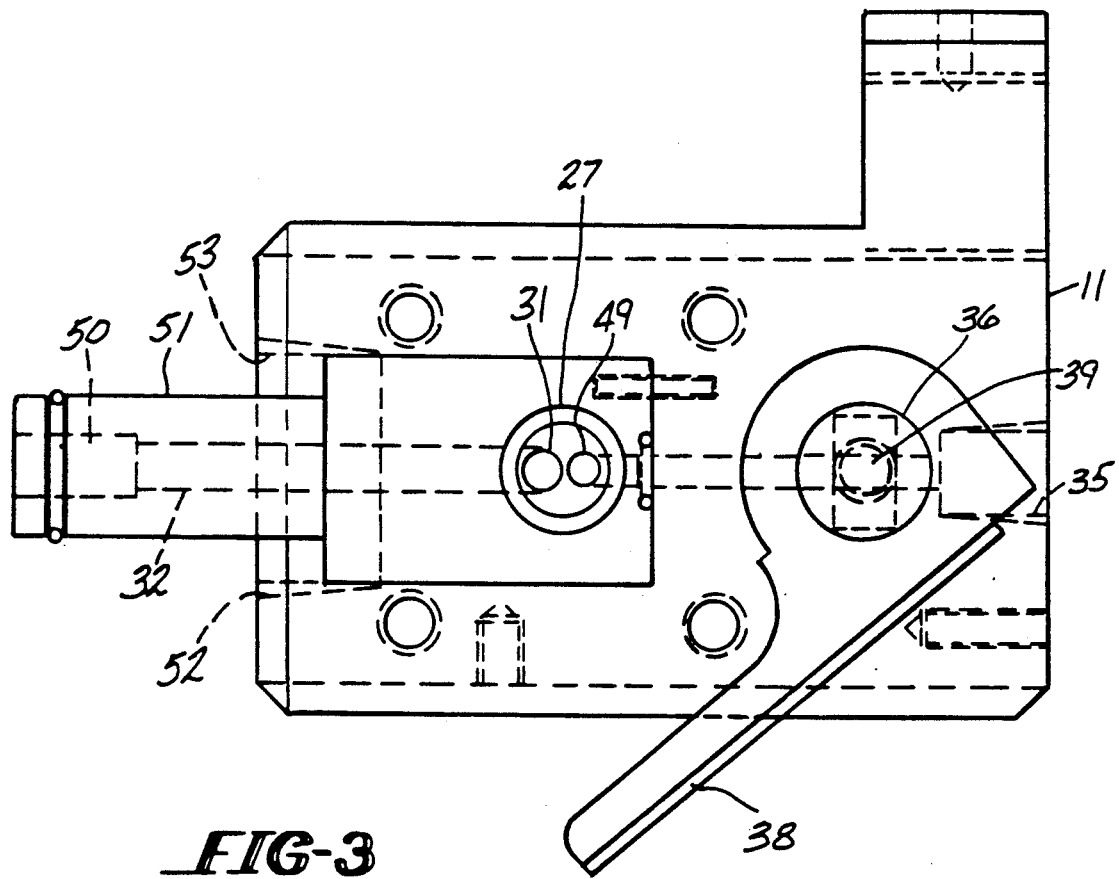
FIG. 3 is a side elevational view of the improved chemical flow stream separator of the present invention inserted within the gun block of FIG. 2 showing the aqueous medium flush activating lever.

The chemical flow stream separator 28 fits as an insert within a hollowed-out opening 53 in gun block 11, partially seen in FIGS. 2 and 3, so that the entire rear portion of the separator 28 and about one quarter of the nozzle 51 is seated within the gun block 11. The remaining portion of the nozzle 51 extends out of the front of the gun block 11 and fits within the adapter fitting 13 and the static mixer (not shown). The hollowed out opening 53 is machined out within the gun block 11 and has tapered threads 52 at its front to secure the adapter fitting 13 and the static mixer (not shown). An adaptor and tighten down nut (also not shown), through which the tubular housing of the static mixer extends, may be utilized to securely fasten the static mixer to the adaptor fitting 13 on the manifold or gun block 11.

It is to be understood that this type of a portable or on-site polyurethane foam dispenser 10 is part of a foam generating system that usually comprises two storage tanks for supplying the two inter-reactive polyurethane-forming materials which are the isocyanate and polyol components. A gas pressure supplying system is provided to pressurize these tanks to expel or force the reactants out therefrom through bulk flow supply lines that connect via the couplings 56 and 58 of FIG. 1 to the feed lines 19 and 20 of the dispenser 10. A typical foam dispenser corresponding to dispenser 10 is shown and described in U.S. Pat. No. 4,073,664, specifically incorporated by reference hereinafter in pertinent part insofar as it is consistent with the present invention and utilizing minor modifications, such as described herein.

The static mixer with its internal mixing elements may be of any suitable design, such as that described in U.S. Pat. No. 4,850,705.

In operation, the dispenser 10 is activated by depression of the trigger switch (not shown) on the handle 17 which allows air to activate the air cylinder 12 and force the cylinder rod (not shown) to cause the rack 15 to move the gear 18 to the open position, thereby rotating the rotary valves 25 and 26. This permits the pressurized isocyanate A component and the polyol B component to flow through the feed lines 19 and 20 into the gun block 11 via the isocyanate and polyol infeed orifices 29 and 30 in the separator 28. The flow streams of the isocyanate A and the polyol B components are kept separate within the separator 28 by passing through the angled isocyanate and polyol infeed passages 30 and 32 until routed into the mixing chamber 50 within the nozzle 51. The isocyanate A and the polyol B components are then combined and fed under pressure into the static mixer tube for further mixing and dispensing as the finished product.

During the foam dispensing operation the manual air control flow valve 34 and the manual aqueous cleaning medium flow control valve 40 have been in the closed positions. When it is necessary to clean the dispenser 10 after the foam dispensing operation, the aqueous cleaning medium flow control valve 40 is opened to permit the cleaning and purging liquid medium, preferably soapy water, to flow through the aqueous cleaning medium feed line 37 and the coupling 24 into the gun block feedline 22. The aqueous cleaning medium then flows into the gun block 11 through the fitting 35 and the cleaning passage 43. Valve 36 is opened by depressing lever 38 to permit the cleaning medium to flow into the isocyanate and polyol cleaning passages 41 and 42, respectively. The cleaning medium then passes into the separator 28 via the internal cleaning and drying passages 46 and 48. The cleaning medium is momentarily routed out of the separator 28 through the outlet ports 49 to clean the exposed portions of the closed rotary valves 25 and 26 and then reenters the separator 28 through the isocyanate and polyol infeed orifices 29 and 31, respectively. The cleaning medium then passes through the isocyanate and polyol internal infeed passages 30 and 32 to flush any residual foam components therefrom into the mixing chamber 50. The cleaning medium can then be directed through the static mixer, or the static mixer can be detached from the dispenser 10 and cleaned separately or discarded, as may be appropriate.

After the aqueous cleaning medium has completed the flushing of the dispenser 10, any residual medium must be removed to preclude reaction with the foam components upon operation of the foam dispenser. This is accomplished by the shutting of the aqueous medium control valve 40 and the opening of the air control valve 34, simultaneously with the continued depression of the valve lever 38, to permit drying air to follow the same route as the aqueous cleaning medium within the gun block 11 and the separator 28. The drying air, or other appropriate gas, is fed from the supply line 21 into the gun block 11 via the coupling 24 and the fitting 35.

While the invention has been described above with the references to specific embodiments thereof, it is apparent that many changes, modifications and variations in the materials, arrangement of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety in pertinent part.

Having thus described the invention, what is claimed is:

1. In a plural component dispensing apparatus for the dispensing of a substance formed from the mixing and reaction of plural components that are selectively fed via flow control means into a dispensing gun block in a plurality of separate plural component flow passageways at a first end and exit the dispensing gun block at an opposing second end, comprising:

(a) a flow stream separator inserted within the gun block connected to the plurality of plural component flow passageways adapted to receive the separate flow of plural components and keep them separate in separator passages, the separator passages feeding the plural components to a point of mixing where they are impingement mixed and exit through an exit passageway from the separator, the separator further having a plurality of separate liquid cleaning medium passageways selectively controlled via second flow control means for the selective flow of cleaning medium therethrough to remove any plural components or reacted plural components for the plurality of plural component flow passageways and the point of mixing and exit passageway of the separator;

(b) a gas feed line connected to the plurality of separate liquid cleaning medium flow passageways effective via third flow control means to selectively dry the liquid cleaning medium flow passageways after cleaning; and (c) liquid cleaning medium feed means to deliver cleaning medium to the liquid cleaning medium passageways.

2. The dispensing apparatus according to claim 1 wherein the flow stream separator is elongated with a rear section connected to the liquid cleaning medium flow passageways.

3. The dispensing apparatus according to claim 2 wherein the flow stream separator further has a mixing chamber in which the plural components meet and are mixed and react, the flow stream separator further having a periphery on the rear section connected to the plural component flow passageways of the gun block.

4. The dispensing apparatus according to claim 3 wherein the flow control means that selectively feed the plural components into the gun block further comprise separate valve means for each component, the valve means being mounted to the dispensing apparatus adjacent the gun block and connected to a corresponding separate plural component flow passageway.

5. The dispensing apparatus according to claim 4 wherein the liquid cleaning medium flow passageways exit the periphery of the separator adjacent the valve means and the plural component flow passageways so as to convey the liquid cleaning medium to clean the valve means and then enter and clean the plural component flow passageways.

6. The dispensing apparatus according to claim 5 wherein the gas feed line further has a valve to selectively control the flow of gas therethrough into the plurality of liquid cleaning medium passageways and the plurality of plural component flow passageways to dry the liquid within the separator.

7. The dispensing apparatus according to claim 6 wherein the second flow control means further comprises a rotary valve that controls the flow of cleaning medium into the dispensing gun block.

8. The dispensing apparatus according to claim 7 wherein the liquid cleaning medium and the drying gas enter the dispensing gun block through the same shared feed line.

9. The dispensing apparatus according to claim 8 wherein the flow stream separator further has a front section connected to the rear section within which is contained the mixing chamber and which defines a nozzle that is smaller in periphery than the rear section.

10. A chemical flow stream separator adapted for insertion into a plural component dispensing apparatus for dispensing of mixed and reacted plural components, comprising in combination:

(a) an elongated front section having a first periphery with a first end and an opposing second end;

(b) at least two plural component feed passageways within the elongated front section;

(c) a mixing chamber formed by the junction of the plural component feed passageways and having an orifice on the first end of the elongated front section to permit mixed and reacted plural components to exit therethrough; and (d) an elongated rear section connected to the opposing second end of the elongated front section on a front end, the rear section having an opposing rear end defining between the front end and the rear end a second periphery, the rear section further having a plurality of passageways therein, at least a portion of the passageways being utilized to transport a liquid cleaning medium and a drying gas therethrough and connected at a common entrance, the passageways having openings in the second periphery to permit the exit of the liquid cleaning medium and the drying gas from the portion of passageways used to transport the liquid cleaning and drying medium from the common entrance and a second set of openings in the second periphery connecting to the plural component feed passageways to selectively permit the passage of plural components through the plural component feed passageways and the subsequent passage of the liquid cleaning medium and drying gas through the plurality of passageways and the plural component feed passageways and the mixing chamber and orifice to permit cleaning and drying of the separator.

11. The separator according to claim 10 wherein the front section is generally cylindrical in shape, the first periphery being smaller than the second periphery of the rear section.

12. The separator according to claim 11 wherein the rear section is generally cylindrical in shape.

13. A method of operating a plural component foam dispenser comprising the steps of:

(a) feeding the plural components in separate flow streams into plural component flow stream passageways within a flow stream separator within the dispenser;

(b) mixing and reacting the separate plural component flow streams in a mixing chamber within the flow stream separator;

(c) ejecting the mixed and reacted plural components from the mixing chamber;

(d) feeding an aqueous cleaning medium into the plural component flow stream passageways within the flow stream separator and the mixing chamber to remove residual plural components and reacted plural components; and (e) directing a drying gas flow stream along the same flow path as the aqueous cleaning medium to dry any liquid remaining in the plural component flow stream passageways and the mixing chamber within the separator to prevent the reaction of the plural components and the aqueous cleaning medium upon resumption of the mixing and reaction process.

14. The method according to claim 13 further comprising using soapy water as the aqueous cleaning medium.

15. The method according to claim 14 further comprising using polyol and isocyanate as the plural components.

16. The method according to claim 15 further comprising using air as the drying gas.

* * * * *